US012558982B2

(12) United States Patent
Christensen et al.

(10) Patent No.: US 12,558,982 B2
(45) Date of Patent: Feb. 24, 2026

(54) INTELLIGENT BREADCRUMB NAVIGATION

(71) Applicants: Randall S. Christensen, Logan, UT (US); Bryce Leonard Hesterman, Logan, UT (US); Todd Moon, Logan, UT (US)

(72) Inventors: Randall S. Christensen, Logan, UT (US); Bryce Leonard Hesterman, Logan, UT (US); Todd Moon, Logan, UT (US)

(73) Assignee: Utah State University, Logan, UT (US)

( * ) Notice: Subject to any disclaimer, the term of this patent is extended or adjusted under 35 U.S.C. 154(b) by 824 days.

(21) Appl. No.: 17/861,707

(22) Filed: Jul. 11, 2022

(65) Prior Publication Data

US 2023/0009037 A1 Jan. 12, 2023

Related U.S. Application Data

(60) Provisional application No. 63/220,357, filed on Jul. 9, 2021.

(51) Int. Cl.
*H02J 7/00* (2006.01)
*B60L 53/36* (2019.01)
(Continued)

(52) U.S. Cl.
CPC .............. *B60L 53/39* (2019.02); *B60L 53/36* (2019.02); *B60L 53/66* (2019.02); *H02J 50/80* (2016.02);
(Continued)

(58) Field of Classification Search
CPC .......... B60L 53/39; B60L 53/36; B60L 53/66; H04B 5/26; H04B 5/79; H02J 50/80; H02J 50/90
(Continued)

(56) References Cited

U.S. PATENT DOCUMENTS 5,708,427 A 1/1998 Bush
5,815,825 A 9/1998 Akihide et al.
(Continued)

FOREIGN PATENT DOCUMENTS

CN 109583545 A 4/2019
EP 2063286 A1 5/2009
(Continued)

*Primary Examiner* — Zixuan Zhou
(74) *Attorney, Agent, or Firm* — Thorpe North & Western, LLP

(57) ABSTRACT

Technology is disclosed for systems, devices, and methods relating to vehicle positioning. A system for vehicle positioning can comprise a passive resonator configured to be embedded in a roadway, and at least one antenna configured to be attached to a vehicle. The at least one antenna can be configured to transmit a first signal to the passive resonator and receive a second signal from the passive resonator at a harmonic frequency of the first signal. Diodes are used to stimulate a resonant circuit to create the second signal. The passive resonator can be configured to receive the first signal from the at least one antenna and transmit a second signal to the at least one antenna. The system can further comprise a processor configured to: calculate a relative position between the vehicle and the passive resonator based on a phase difference observed between the first signal and a reference signal.

21 Claims, 13 Drawing Sheets

100

(51) Int. Cl.

| | | |
|---|---|---|
| *B60L 53/39* | (2019.01) | |
| *B60L 53/66* | (2019.01) | |
| *H02J 50/80* | (2016.01) | |
| *H02J 50/90* | (2016.01) | |
| *H04B 5/26* | (2024.01) | |
| *H04B 5/79* | (2024.01) | |

(52) U.S. Cl.
CPC ................ *H02J 50/90* (2016.02); *H04B 5/26* (2024.01); *H04B 5/79* (2024.01)

(58) Field of Classification Search
USPC .......................................... 320/108; 307/104
See application file for complete search history.

(56) References Cited

U.S. PATENT DOCUMENTS

| | | | |
|---|---|---|---|
| 6,577,246 B1 | 6/2003 | Satoru et al. | |
| 2010/0184371 A1* | 7/2010 | Cook ...................... | H02J 50/12 |
| | | | 455/41.1 |
| 2016/0025848 A1* | 1/2016 | Holé ..................... | G01S 13/753 |
| | | | 701/300 |
| 2017/0120804 A1* | 5/2017 | Kentley ................. | G08G 1/167 |
| 2019/0275901 A1* | 9/2019 | Widmer ................. | B60L 53/68 |

FOREIGN PATENT DOCUMENTS

| | | | |
|---|---|---|---|
| JP | 2001236592 A | 8/2001 | |
| JP | 2004164091 A | 6/2004 | |
| KR | 102002583 B1 | 7/2019 | |

* cited by examiner

INTELLIGENT BREADCRUMB NAVIGATION

RELATED APPLICATION

This application claims priority to U.S. Provisional Application No. 63/220,357 filed Jul. 9, 2021, which is incorporated herein by reference.

FIELD OF THE INVENTION

The present disclosure relates to vehicle localization and control. Therefore, the present disclosure relates generally to the fields of electronics, wireless communication, wireless power transfer, and automotive technology.

BACKGROUND

Autonomous vehicles can use a variety of sensors to perceive their surrounds, including radar, lidar, sonar, GPS, and inertial measurement units. Control systems can interpret sensory information to identify navigation paths, obstacles, and signs. However, the cost of including these sensors and control systems can be prohibitive. Therefore, accurate, reliable, and inexpensive vehicle localization can be useful in leading to the widespread adoption of connected and automated vehicles (CAVs). For Dynamic, Wireless Power Transfer (DWPT) systems, accurate localization can also provide efficient acquisition of energy.

SUMMARY

In one embodiment, a system for vehicle positioning can comprise a passive resonator configured to be embedded in a roadway, and at least one antenna configured to be attached to a vehicle. In one aspect, the at least one antenna can be configured to transmit a first signal to the passive resonator and receive a second signal from the passive resonator. In one aspect, the passive resonator can be configured to receive the first signal from the at least one antenna and transmit a second signal to the at least one antenna. The system can further comprise a processor configured to calculate a relative position between the vehicle and the passive resonator based on a phase difference observed between the second signal and a reference signal. The processor can be further configured to calculate an absolute location of the vehicle based on the relative position between the vehicle and the passive resonator and an absolute location of the passive resonator.

In another embodiment, a passive resonator circuit for vehicle positioning, can comprise a first loop antenna connected in series with a first capacitor to form a first series-resonant circuit, a second capacitor coupled in series with a second loop antenna to form a second series-resonant circuit, and a pair of inverse-parallel connected diodes that are connected in parallel with the first and second resonant circuits. In one aspect, the first loop antenna can be configured to receive a signal at a first frequency in a radio frequency band and the second loop antenna can be configured to transmit a harmonic of the signal at a second frequency. In yet another embodiment, a device for vehicle positioning can comprise at least one antenna configured to transmit a first signal to a passive resonator configured to be embedded in a roadway. In one aspect, the at least one antenna can be configured to receive a second signal from the passive resonator. In another aspect, the at least two antennas can be configured to receive a second signal from the passive resonator. In another aspect, the device can further comprise a processor configured to calculate a relative position between the vehicle and the passive resonator based on a phase difference observed by the at least two antennas. In another aspect, the processor can be further configured to calculate an absolute location of the vehicle based on the relative position between the vehicle and the passive resonator and an absolute location of the passive resonator.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

Figure 1:
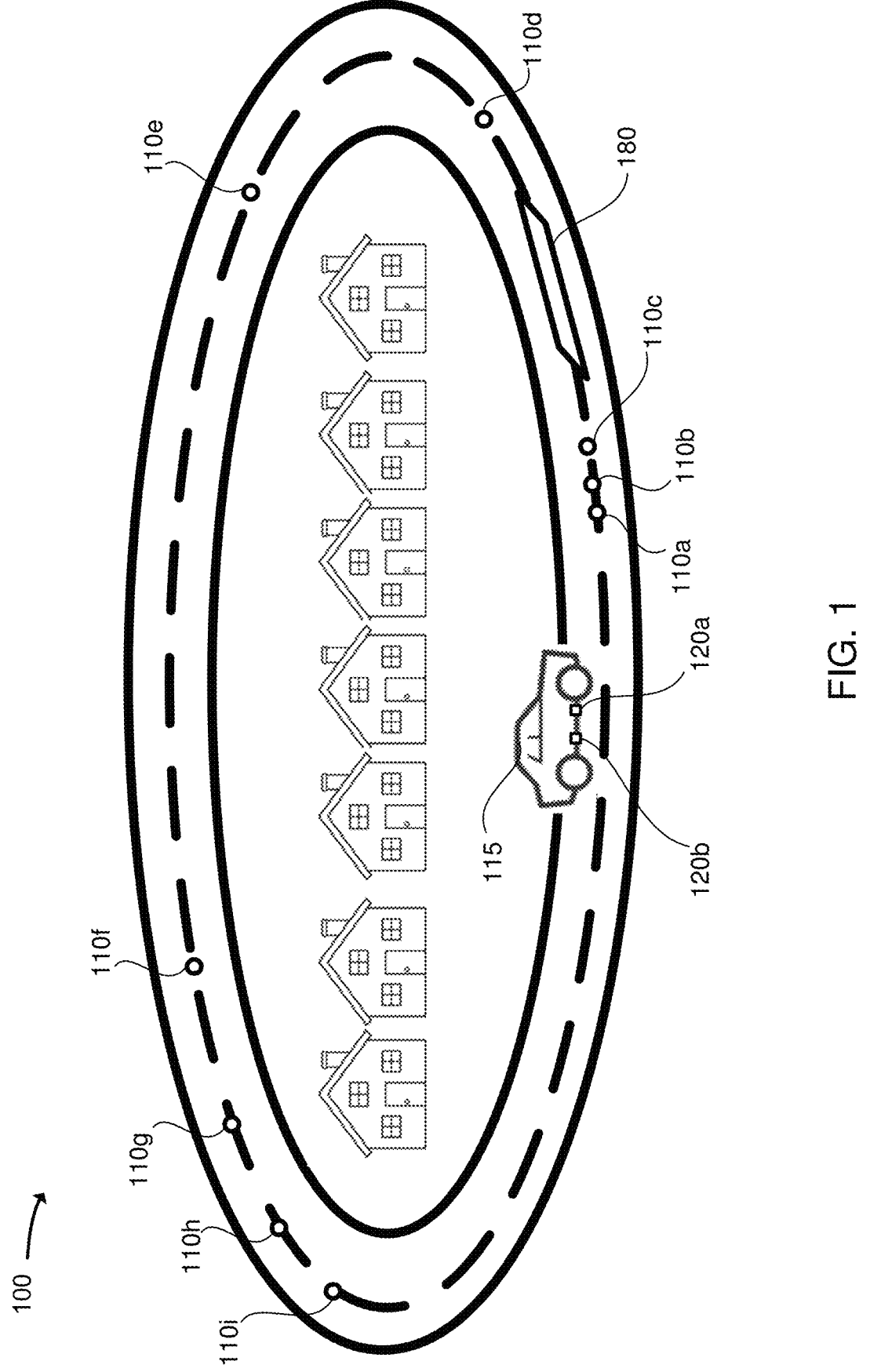
FIG. 1 is an illustration of an intelligent breadcrumb (IBC) navigation system comprising a radiating antenna, a passive resonator circuit, and a receiving antenna in accordance with an example.

These drawings are provided to illustrate various aspects of the invention and are not intended to be limiting of the scope in terms of dimensions, materials, configurations, arrangements, or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a passive resonator" includes reference to one or more of such materials and reference to "receiving" or "transmitting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, comparative terms such as "increased," "decreased," "better," "worse," "higher," "lower," "enhanced," "improved," "maximized," "minimized," and the like refer to a property of a device, component, or activity that is measurably different from other devices, components, or activities that are in a surrounding or adjacent area, that are similarly situated, that are in a single device or multiple comparable devices, that are in a group or class, that are in multiple groups or classes, or the known state of the art.

Reference in this specification may be made to devices, structures, systems, or methods that provide "improved" performance. It is to be understood that unless otherwise stated, such "improvement" is a measure of a benefit obtained based on a comparison to devices, structures, systems, or methods in the prior art. Furthermore, it is to be understood that the degree of improved performance may vary between disclosed embodiments and that no equality or consistency in the amount, degree, or realization of improved performance is to be assumed as universally applicable.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Occurrences of the phrase "in one embodiment," or "in one aspect," herein do not necessarily all refer to the same embodiment or aspect. Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of invention embodiments is provided below and specific embodiments are then described in further detail. This initial summary is intended to aid readers in understanding the technological concepts more quickly, but is not intended to identify key or essential features thereof, nor is it intended to limit the scope of the claimed subject matter.

Accurate and reliable vehicle localization can be a subsystem of the connected and automated vehicles (CAVs) of the future. This subsystem can provide efficient expenditures of CAV energy to allow the vehicle to modify its behavior based on traffic conditions, changes in grade, user-provided travel constraints, and the like. Further, in the case of Dynamic Wireless Power Transfer (DWPT), accurate localization can also provide an efficient acquisition of energy by enhancing the alignment between transmitting coils in the roadway and the receiving coils on-board the CAV.

Global Navigation Satellite Systems (GNSS), such as Global Positioning System (GPS), have been attempted as the localization source, but have clear defects in terms of absolute accuracy, margin of error, robustness to multipath, signal degradation, or denial.

Researchers have tried over recent decades to augment the CAV with an expanding variety of sensors. However, the additional sensors are expensive and have excessive on-board computational restraints. As such, vehicle positioning remains a significant area of further research.

One of the defects associated with low-cost GPS receivers include errors of up to 4 meters in the horizontal position, with random errors near 0.4 meters. In urban environments, the errors can increase due to obstructions, dilution of precision, and multipath. Advancements in perception have mitigated some of these errors but have resulted in additional sensors with additional computations. Furthermore, reliability in inclement weather and poor visibility remain a significant challenge.

This disclosure provides a system that can address GNSS defects and challenges as either a stand-alone system or as an augmentation to existing perception systems can enhance reliability in complex or difficult environments. In contrast to other sensor systems (e.g., cameras and Lidar), the system in this disclosure can operate independent of lighting conditions, road surface reflectivity, visibility, and weather. Because EM fields can be generated locally, multipath can be avoided and the likelihood of interference can be reduced. In the event of missed detections, either due to system malfunctions or interference, error correction codes can provide robust operation. Lastly, this disclosure provides a system that can be an anchor for other localization systems, such as GNSS, to increase overall reliability and resolve systematic biases.

In one example, vehicle localization and the associated computational load can be enhanced using a low-cost localization infrastructure based on a sequence of passive resonators embedded in the roadway (e.g., a series of Intelligent Bread Crumbs (IBC)). By detecting the presence, spacing, and other attributes of the IBCs, the CAV can localize both relative to the roadway and globally at increased accuracy and robustness levels. In contrast with other CAV trends using Lidar, EO/IR cameras, Radar, and the like, the CAV can acquire adequate positional information using at least one transmit/receive antenna.

The IBCs can be passive devices that receive an RF signal at one frequency and convert some of the received energy to a different RF frequency that can be a harmonic of the received frequency. By using IBCs, the lateral position of a vehicle within a road lane can be measured by sensing the phase of signals coming from the IBCs embedded in depressions in the surface of the roadway or glued to the surface of the roadway. The lateral position sensing can maintain a vehicle centered in a lane, which can be useful for autonomous vehicles steering and for aligning vehicles with wireless charging coils embedded in a roadway.

Thus, in one example, a system for vehicle localization can include: 1) a transmitter on the CAV, 2) a passive receiver/harmonic transmitter embedded in the roadway, 3) one or more receiving antennas laterally spaced across the CAV, and 4) a multichannel receiver/signal processor. The transmitter on the CAV can generate a high-frequency magnetic field. AC waveforms can be generated in the passive receiver/harmonic transmitters embedded in the roadway. The passive receiver/harmonic transmitters can be excited by the magnetic field generated by the vehicle transmitter. The passive receiver/harmonic transmitter underneath the vehicle can generate a signal at about three times the frequency of the transmitted signal. The multichannel receiver/signal processor can calculate the phase difference between pairs of the receiving channels to determine the position of the CAV.

In one embodiment, a system for vehicle positioning can comprise a passive resonator configured to be embedded in a roadway, and at least one antenna configured to be attached to a vehicle. In one aspect, the at least one antenna can be configured to transmit a first signal to the passive resonator and receive a second signal from the passive resonator. In one aspect, the passive resonator can be configured to receive the first signal from the at least one antenna and transmit a second signal to the at least one antenna. The system can further comprise a processor configured to calculate a relative position between the vehicle and the passive resonator based on a phase difference observed between the second signal and a reference signal. The processor can be further configured to calculate an absolute location of the vehicle based on the relative position between the vehicle and the passive resonator and an absolute location of the passive resonator.

In another embodiment, a passive resonator circuit for vehicle positioning, can comprise a first loop antenna coupled in parallel with a second loop antenna, a first capacitor coupled in series with the first loop antenna, a second capacitor coupled in series with the second loop antenna, and a pair of diodes coupled in parallel with the first loop antenna and the second loop antenna. In one aspect, the first loop antenna can be configured to receive a signal at a first frequency in a frequency band and the second loop antenna can be configured to transmit a harmonic of the signal.

In yet another embodiment, a device for vehicle positioning can comprise at least one antenna configured to transmit a first signal at a first frequency to a passive resonator configured to be embedded in a roadway. In one aspect, the at least one antenna can be configured to receive a second signal from the passive resonator. In another aspect, the device can further comprise a processor configured to calculate a relative position between the vehicle and the passive resonator based on a phase difference observed between the second signal received from the passive resonator and a reference signal. In another aspect, the processor can be further configured to calculate an absolute location of the vehicle based on the relative position between the vehicle and the passive resonator and an absolute location of the passive resonator. In another aspect, the processor is further configured to calculate the relative position between the vehicle and at least one of an exit ramp, an on-ramp, a lane number, an end of lane indicator, and a combination thereof based on passive resonator sequence data comprising on-off keying (OOK) data, frequency-shift keying (FSK) data, or pulse position modulation (PPM) data.

In one embodiment, as illustrated in FIG. 1, a system 100 including a low-cost DWPT infrastructure can be coupled with antennas onboard the CAV 115 (e.g., a vehicle) to enhance localization. In one example, the CAV 115 can include at least one antenna (e.g., 120a, 120b). In one example, the at least one antenna can be a transceiver. In another example, the at least one antenna can comprise a plurality of antennas (e.g., a transmitting antenna 120a and a receiving antenna 120b).

In one example, the at least one antenna (e.g., 120a) can be coupled to a radiofrequency (RF) generator operating at a selected transmitting frequency (e.g., 40.68 MHz). The at least one antenna (e.g., 120a) can include an array of coils 120a spanning the width of the vehicle 115. This array of coils 120a can be coupled to capacitors forming a resonant circuit tuned to the transmitting frequency (e.g., 40.68 MHz). In one example, the array of coils 120a can be about 100 mm in diameter and positioned on or inside a vehicle bumper. The antenna array 120a can be about 30 cm above the pavement. The antenna array 120a can be configured to generate near-field magnetic radiation at about 40.68 MHz that the passive resonator 110a to 110i can convert to a suitable current for re-transmission from the passive reso-nator 110a to 110i to the vehicle 115.

The wavelength of the transmitted frequency from the vehicle to the passive resonator 110a to 110i can be greater than the width of the vehicle 115 (e.g., for a 40.68 MHz signal the wavelength is about 7.37 m). Thus, the at least one antenna 120a can generate a magnetic field that spans the width of the vehicle 115. The antenna 120a can be used for near-field magnetic radiation transmission with a magnetic field suitable for operating a passive resonator 110a to 110i located near the surface of a roadway underneath the vehicle 115. In one example, the transmitted signal can be within an unlicensed frequency band, such as the Industrial Scientific and Medical (ISM) band centered at about 40.68 MHz. Some of the energy received by the passive resonator 110a to 110i is converted to energy at the third harmonic of the signal transmitted by the CAV, and this third harmonic energy is transmitted back to the receiving antenna 120b of vehicle 115. The third harmonic of 40.68 MHz can be about 122 MHz.

In some cases, the passive resonator 110a to 110i can be within range of the transmitting and receiving antennas 120a, 120b for several milliseconds at highway speeds. To save energy, the transmitted signal from the transmitted antenna 120a can be pulsed at a suitable duty cycle. For example, when the transmitter 120a is on for 10 μs at a time, more than 1000 cycles of 122 MHz can be generated. When the transmitter 120a is pulsed at a 2 percent duty cycle, then there can be a transmitter pulse every 500 μs. When the passive resonator 110a to 110i is in communication range for 5 milliseconds, then 10 transmitted pulses can be received at the receiving antenna 120b, with each pulse including more than 1000 cycles of 122 MHz. Thus, the number of trans-mitted pulses and cycles received at the vehicle 115 can be adequate for determining the passive resonator 110a to 110i position in relation to the vehicle 115 and for decoding data that can be encoded by modulating the harmonic signal at the passive resonator 110a to 110i.

The infrastructure can further include one or more passive resonators (e.g., 110a, 110b, 110c, 110d, 110e, 110f, 110g, 110h, or 110i) embedded in the roadway. As the CAV 115 drives, the transmitting antenna 120a can be configured to transmit a signal. A passive resonator (e.g., 110a, 110b, 110c,

110d, 110e, 110f, 110g, 110h, or 110i) can be configured to receive the signal from the transmitting antenna 120a. The passive resonator can be further configured to re-transmit a third harmonic to the CAV's 115 receiving antenna 120b.

A passive resonator 110a to 110i can receive a relatively strong 40.68 MHz signal and radiate a relatively weak signal at the third harmonic of 40.68 MHz (e.g., 122 MHz). Because the 122 MHz signal generated from the passive resonator 110a to 110i can be relatively weak compared to the 40.68 MHz signal received by the passive resonator 110a to 110i, the 122 MHz signal would not cause excessive interference with other electronic devices (e.g., other vehicle electronics, cell phones, or the like).

The 122 MHz signal can have a wavelength of about 2.46 meters (or about 8 feet in air). The maximum width of road vehicles is often limited to about 8.5 feet; therefore, a wavelength of a 122 MHz signal can be greater than the distance between the tires of the vehicle 115. Consequently, the lateral position of the passive resonator 110a to 110i can be determined by comparing the phase of the received signal from the passive resonator 110a to 110i to a reference signal.

The certainty of the position of the passive resonator 110a to 110i can be enhanced by having additional receiving antennas 120b spaced at predetermined intervals along the width of the vehicle 115. For example, three receiving antennas 120b can be used to calculate a more precise location than the location calculated from one receiving antenna 120b. Furthermore, when using frequencies with shorter wavelengths than those wavelengths arising from a 122 MHz signal, additional receiving antennas can be used to determine the position of the passive resonators 110a to 110i with enhanced precision with respect to the location of the vehicle 115 because signals having frequencies with shorter wavelengths carry information that is less precise than signals having frequencies with longer wavelengths.

The receiving antenna 120b on the vehicle can be used to receive the 122 MHz signal from the passive resonator 110a to 110i and compare the phase of that received signal to a 122 MHz reference signal. In one example, the 122 MHz reference signal can be divided by three to generate a 40.68 MHz signal that can be amplified and directed to the transmitting antenna 120a for transmission to additional passive resonators 110a to 110i at subsequent times.

In one example, the transmitting antenna 120a and the receiving antenna 120b can be separated by a distance. In one aspect, the transmitting antenna 120a can comprise an antenna array having at least four separate transmitting antennas spanning the width of the vehicle. In another aspect, the receiving antenna 120b can comprise an antenna array having at least three distinct receiving antennas posi-tioned near both sides of the vehicle and near the center of the vehicle. For example, the three distinct receiving anten-nas can each comprise a 5" by 16" PCB that can collectively have a 5" by 48" area. The lateral position of a passive resonator can be calculated by comparing the phase of the signals from the three distinct receiving antennas.

In a further aspect, a processor can be configured to calculate the phase difference observed between a reference signal and the signal received at the receiving antenna 120b as retransmitted from the passive resonator (e.g., 110a, 110b, 110c, 110d, 110e, 110f, 110g, 110h, or 110i) embedded in the roadway to determine the CAV's 115 position relative to the one or more passive resonators (e.g., 110a, 110b, 110c, 110d, 110e, 110f, 110g, 110h, or 110i). In another aspect, the processor can be configured to calculate an absolute location of the CAV 115 based on the relative position between the vehicle and the passive resonator (e.g., 110a, 110b, 110c,

110*d*, 110*e*, 110*f*, 110*g*, 110*h*, or 110*i*) and an absolute location of the passive resonator (e.g., 110*a*, 110*b*, 110*c*, 110*d*, 110*e*, 110*f*, 110*g*, 110*h*, or 110*i*).

In one aspect, the processor can be configured to calculate the relative position between the vehicle (e.g., the CAV 115) and the passive resonator (e.g., 110*a*, 110*b*, 110*c*, 110*d*, 110*e*, 110*f*, 110*g*, 110*h*, or 110*i*) based on the phase difference with a variability of less than 5 cm. In another aspect, the processor can be configured to calculate the relative position between the vehicle (e.g., the CAV 115) and the passive resonator (e.g., 110*a*, 110*b*, 110*c*, 110*d*, 110*e*, 110*f*, 110*g*, 110*h*, or 110*i*) with the variability of less than 5 cm even in an adverse weather condition or an adverse environment.

In one example, an adverse weather condition can include a weather condition that can interfere with the transmission of a radio signal. In one example, as adverse weather condition can include one or more of: rain, snow, humidity, lightening, clouds, fog, hail, wind, cold weather, hot weather, the like, or a combination thereof. In another example, an adverse weather event can further include a severe weather event (e.g., a cyclone, ice fog, hurricane, severe thunderstorm, tornado, waterspout, tropical cyclone, windstorm, winter storm, or the like).

In another example, an adverse environment can include an environment that can interfere with the transmission of a radio signal. In one example, an adverse environment can include one or more of: a physical obstruction (e.g., mountains, hills, forests, ridges, building material or tall buildings, a canyon, a tunnel), a type of setting (e.g., rural or urban), a road layout (e.g., an intersection, a curve, an overpass, an underpass, a freeway, a city street, or the like).

In one example, the passive resonators 110*a*, 110*b*, 110*c*, 110*d*, 110*e*, 110*f*, 110*g*, 110*h*, or 110*i* can comprise an approximate two-inch diameter printed circuit board (PCB) housed in a plastic puck that can be about 3 inches in diameter and about 1.25 inches thick. The PCB can be positioned about 0.25 inches below the surface of the puck so that the components can be about 1 inch above the roadway surface. For locations having snowplows, the three-inch diameter holes can be ground into the roadway surface to insert the pucks. The surface of the pucks can be flush with the roadway surface. In locations without snowplows, the pucks can have beveled edges and be placed on the roadway surface with a suitable adhesive.

In one aspect, the processor can be configured to calculate the relative position between the vehicle (e.g., the CAV 115) and the passive resonator (e.g., 110*a*, 110*b*, 110*c*, 110*d*, 110*e*, 110*f*, 110*g*, 110*h*, or 110*i*) without using a supplemental sensor including at least one of lidar, an electro-optical/ infrared (EO/IR) camera, a radar, or a combination thereof. In another aspect, the processor can be configured to calculate the absolute location of the vehicle (e.g., the CAV 115) without using a global navigation satellite system (GNSS), such as GPS.

In another example, a DWPT transmitting coil 180 can be configured to align with a receiving coil (not shown) on the CAV 115. In one aspect, a transmitting coil 180 can be configured to align with a receiving coil on the CAV 115 to provide a selected level of in-motion wireless power transfer between the receiving coil and the transmitting coil 180 in the roadway.

Figure 2A:
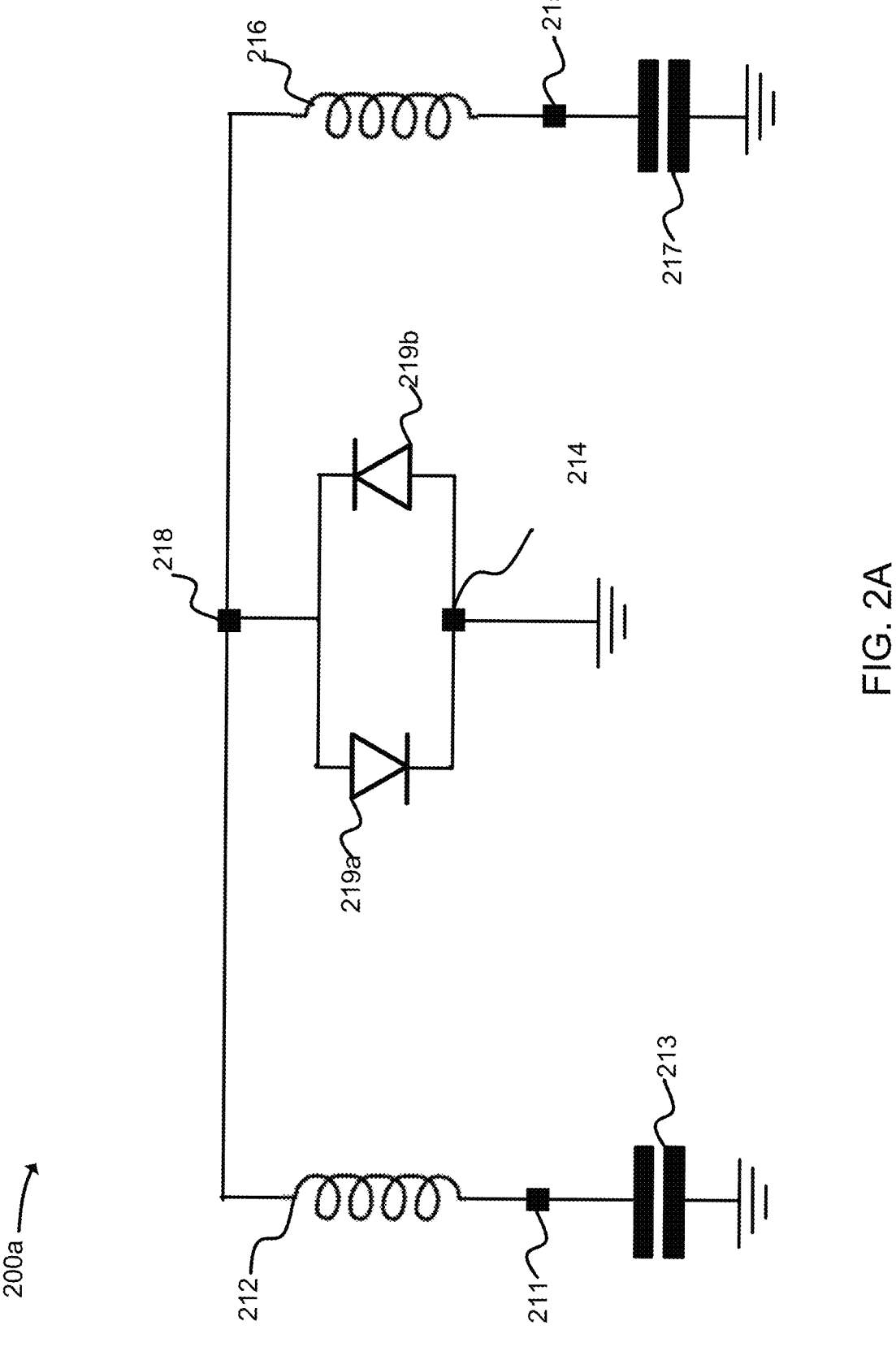
FIG. 2A is an illustration of a passive resonator circuit in accordance with an example.

In another embodiment, as illustrated in FIG. 2A, reliable and cost-effective circuitry can be configured to detect and localize the passive resonator circuit 200*a* (e.g., an IBC) with respect to a passing vehicle. This passive resonator circuit 200*a* can be low cost and can comprise two wire loop antennas 212 and 216, two diodes 219*a* and 219*b*, and two capacitors 213 and 217, which can each be contained in a 2-inch printed circuit board (PCB). The wires could be traces etched onto the PCB, or actual wires attached to the PCB. The loop antennas are each comprised of at least one turn. The passive resonator circuit 200*a* can comprise a receive antenna 212 configured to receive a signal transmitted by a passing vehicle and a transmit antenna 216 configured to retransmit a third harmonic of the signal.

In another embodiment, a passive resonator circuit 200*a* for vehicle positioning can comprise a first loop antenna 212 coupled in parallel with a second loop antenna 216. In one aspect, the passive resonator circuit 200*a* can comprise a first capacitor 213 coupled in series with the first loop antenna 212. In another aspect, the passive resonator circuit 200*a* can comprise a second capacitor 217 coupled in series with the second loop antenna 216. The passive resonator circuit 200*a* can further comprise a pair of inverse-parallel diodes (e.g., 219*a* and 219*b* which can be coupled to ground via node 214) coupled in parallel with the first loop antenna 212 and the second loop antenna 216. In one aspect, the first loop antenna 212 can be configured to receive a signal having a frequency in a selected frequency band and the second loop antenna 216 can be configured to transmit a harmonic of the signal. In one aspect, the passive resonator circuit can comprise a PCB.

In one aspect, the first capacitor 213 can be configured to be coupled in series to the first loop antenna via a node 211. Energy received by the first loop antenna is converted to a nearly sinusoidal current due to the first capacitor 213 being tuned to resonate at the frequency transmitted by the vehicle. This nearly sinusoidal current flows through diodes 219*a* and 219*b*. A distorted, non-sinusoidal voltage is developed at node 218 with respect to node 214 due to the nonlinear behavior of the diodes. The distorted voltage contains odd harmonics of the frequency transmitted by the vehicle, with the third harmonic typically being predominant. In another aspect, the second capacitor 217 can be configured to be coupled in series to the second loop antenna 216 via a node 215. The second capacitor 218 is selected so that it resonates with the second loop antenna 216 at one of the harmonic frequencies produced by the diodes. In another aspect, the first loop antenna 212 can be configured to be coupled in parallel to the second loop antenna 216 via a node 218. Thus although both loop antennas are connected to node 218, the current in the first loop antenna 212 is predominantly composed of the frequency transmitted by the vehicle 215 because it forms a resonant circuit with capacitor 213, while the current in the second loop antenna 216 is predominantly composed of the harmonic frequency that it is tuned to in conjunction with capacitor 217.

In one embodiment, the receive frequency can be a selected frequency within a frequency range of from about 40.66 MHz to about 40.70 MHz. When the received frequency is a selected frequency within the frequency range of from about 40.66 MHz to about 40.70 MHz, the re-transmit frequency can be a harmonic of the selected frequency. In one example, the selected transmit frequency can be about 40.68 MHz and the harmonic of the selected transmit frequency used for retransmission can be a third harmonic (e.g., about 122 MHz).

The receive frequency can be selected to have a wavelength that spans a vehicle length and distance from the position of the transmitting antenna on the vehicle to the road surface. In one example, the receive frequency can be a selected frequency within a frequency range of from about 1 MHz to about 500 MHz. In another aspect, the re-transmit frequency can be a harmonic of the selected frequency in a range of from about 1 MHz to about 1 GHz. As a general guideline, 40.68 MHz is a particularly useful frequency because it is an ISM frequency, and because the third harmonic of that frequency has a wavelength that is longer than the typical width of a vehicle bumper (e.g. 5.8-6.5 feet or about 6 feet) upon which the at least one receiving antenna is located. This allows the phase of the received signals with respect to the reference signal to be uniquely resolved, thereby enhancing the ability to determine the position of the passive radiator to the vehicle. At higher frequencies where the wavelength is smaller than a typical width of a vehicle bumper upon which the at least one receiving antenna is located, the phase versus position has a repeating relationship instead of a unique relationship, so more antennas and processing would be required to precisely determine the position of the vehicle with respect to the passive radiator. At lower frequencies where the wavelength is larger than typical width of a vehicle bumper upon which the at least one receiving antenna is located, the phase relationship of the received signal with respect to the reference signal is also unique, but the phase deviation with respect to the position of the passive radiator is diminished and so it may be more difficult to resolve.

The receive frequency can be selected to provide a harmonic frequency that can be detected at a selected bumper height of a vehicle. In one example, the second loop antenna can be configured to retransmit the harmonic to a height of from about 20 cm to about 80 cm. In another example, a transmit frequency of about 40.68 MHz can be selected to provide a third harmonic of about 122 MHz to be detected at a bumper height of about 30 cm. In this instance, the at least one antenna (e.g., 120a, 120b) coupled to a CAV 115) can receive a phase difference between a reference signal and reception of the harmonic of the signal from the passive resonator circuit that can provide a margin of error of less than about 5 cm for the vehicle position relative to the passive resonator circuit. In one example, the margin of error can be less than about 5 cm in various lighting conditions, adverse weather conditions, adverse environments, and the like.

The first loop antenna 212 can be configured to generate a voltage waveform at the node 218 that is suitable to generate a current through diodes 219a and 219b that is sufficient to develop a distorted, non-sinusoidal voltage at node 218 with respect to node 214 due to the nonlinear behavior of the diodes. The energy received by the first loop antenna 212 is directly related to the area of the loop and the voltage produced is related to the number of turns of the coil. Increasing the area of the loop antenna, however, also increases the uncertainty of the position of the antenna with respect to the vehicle and also increases the cost of the plastic puck that contains the antenna. Increasing the area of the loop also increases the inductance of the loop and to maintain resonance at a particular frequency, the capacitor 213 can proportionally decrease as the inductance increases. Smaller values of capacitance increase the likelihood of the resonance being detuned by stray capacitances due to nearby objects.

The second loop antenna 216 re-transmits a harmonic from the passive resonator to a vehicle. Since the second loop antenna can be tuned to a harmonic of the transmitted frequency, it is useful for the second loop antenna to have less inductance than the first loop antenna, which typically means that the second loop antenna would be physically smaller than the first loop antenna. In one aspect, the first loop antenna 212 can be configured to have a first diameter of about 52 mm and a first inductance of about 140 nH.

In another aspect, the second loop antenna 216 can be configured to have a second diameter of about 25 mm and a second inductance of about 56 nH.

The lower limit of the capacitance values can be determined by the potential effects of stray capacitance from nearby objects and also from the stray capacitances of the inductors. A lower limit of about 50 pF for the capacitances can be chosen although other limits may be suitable based on design decisions, and that would determine the inductances to resonate at the desired frequencies. These inductances in turn place limits on the physical sizes of the loop antennas. Methods for determining loop antenna dimensions are commonly known to radio engineers.

The loop antenna dimensions stated above are for two circular single-turn coils that are concentric and co-planar. The two loop antennas will have some magnetic coupling between them and that changes the resonant frequencies from what they would be if they were uncoupled. The magnetic coupling coefficient between the two example coils is approximately 0.15, which is low enough to enable the coils to be tuned to different frequencies. Other coil configurations could also be used, provided that the magnetic coupling between the two coils is low enough to accommodate the desired resonant frequencies. It is useful to have coils that are radially symmetric so that the orientation of the installed pucks does not need to be considered. Magnetic coupling between two coils can be minimized by overlapping them in way that minimizes the coupled flux. One way to achieve radial symmetry while minimizing the magnetic coupling between the first and second antennas would be to have the receiving antenna coil surrounded by three or more smaller coils that overlap the receiving antenna coil, and are evenly spaced around the receiving coil, and partially overlap it. The at least three smaller coils are electrically connected together to form the second loop antenna that is tuned to a harmonic frequency.

It may be desirable to limit the puck diameter to about three or four inches to minimize the cost of the plastic material and to facilitate installation; otherwise, larger dimensions may be used. The stated coil dimensions are suitable for a three-inch diameter puck.

Figure 2B:
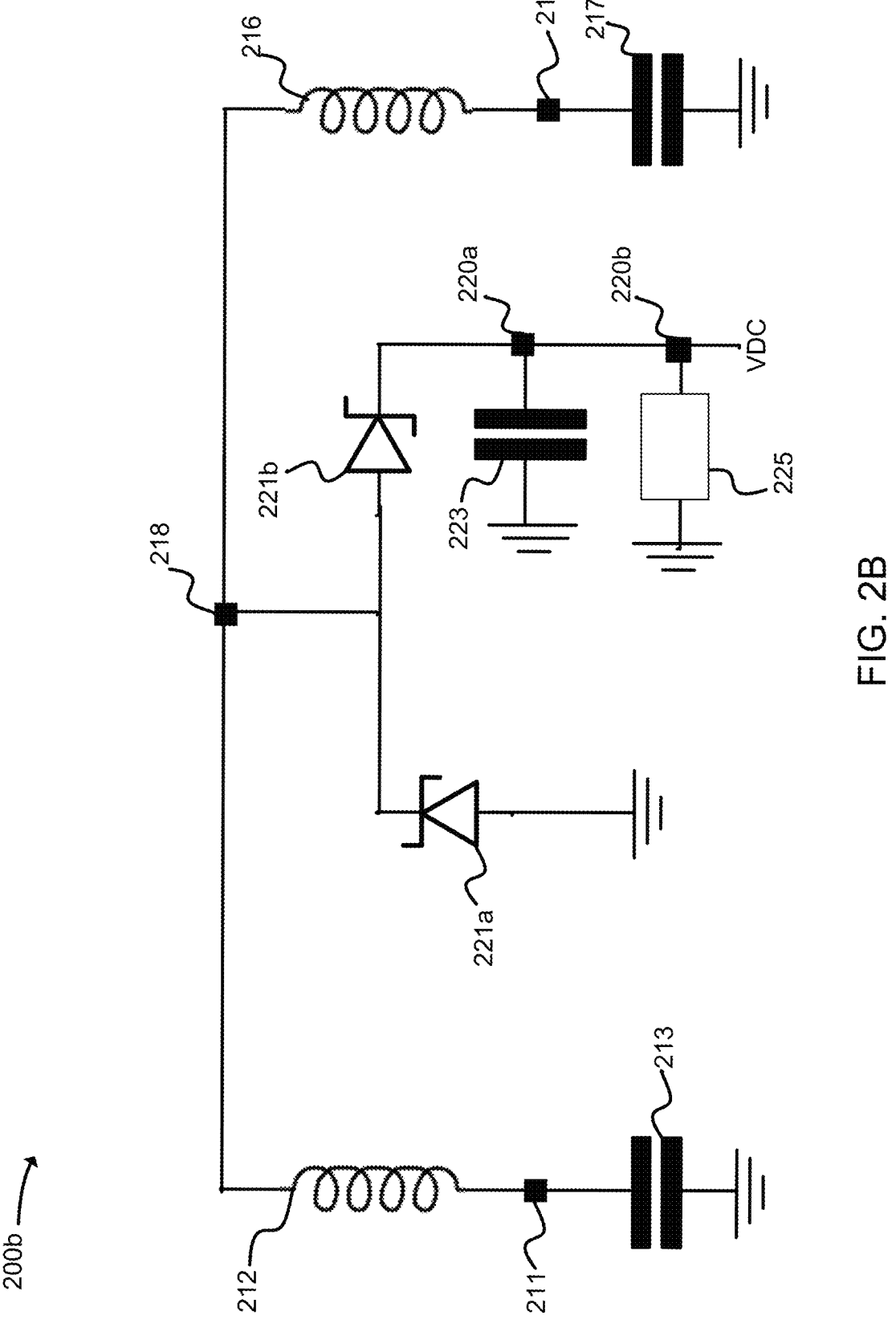
FIG. 2B is an illustration of a passive resonator circuit in accordance with an example.

In another embodiment, FIG. 2B illustrates a passive resonator circuit 200b having a pair of diodes 221a and 221b coupled to node 218 and arranged in a voltage doubler configuration. This passive resonator circuit 200b can comprise a capacitor 223 coupled at node 220a. The passive resonator circuit 200b can be configured to generate a DC output voltage at node 220b that can power a logic circuit 225 such as a low-power microcontroller. The microcontroller can turn a switching device on and off in a pattern to encode digital information in the harmonic transmitting signal within a certain time. In one example, the microcontroller can be a commercially available device such as a ATtiny 212 from Microchip Technology, Inc. The logic circuit could also be as simple as a clock which causes a pattern to be read out from a programmed memory device and sent to an output terminal adapted to drive a MOSFET that has a low gate threshold voltage such as a 2N7002 N-channel MOSFET. In this passive resonator circuit 200b the DC output voltage can be in the range of 1.8 to 3.3 V suitable for driving a microcontroller, and the output power can be about 10-20 mW. A Zener diode can be used to limit the DC voltage to a value that is safe for the logic circuit. The logic circuit can modulate the 122 MHz signal with data including the location of the passive resonator circuit. For this passive resonator circuit 200*b*, Schottky diodes can generate a greater dc output voltage compared to silicon junction diodes.

Instead of transmitting a harmonic signal back to the vehicle, the DC output voltage could instead be used to power an oscillator at any desired frequency that can be coupled to an antenna.

Figure 2C:
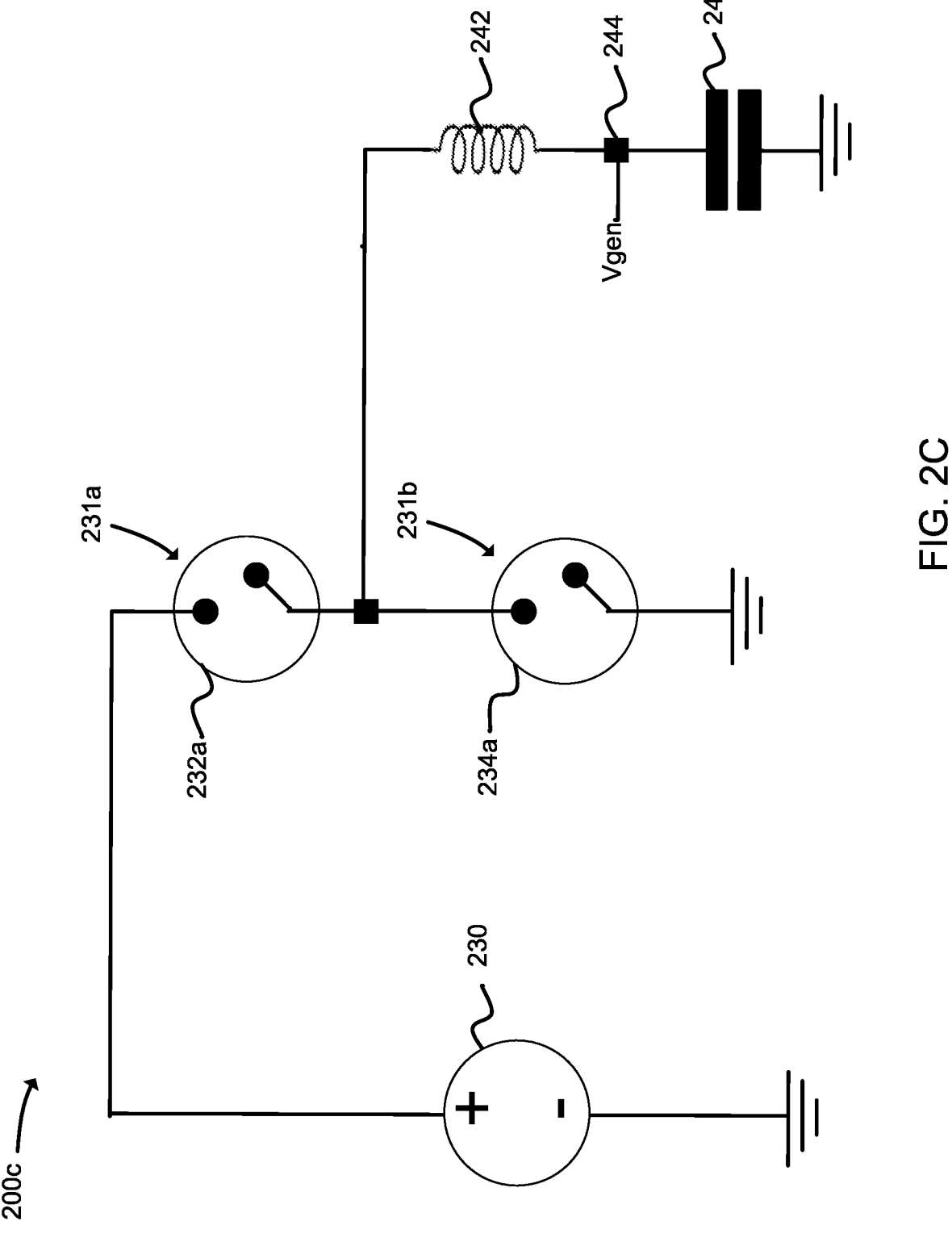
FIG. 2C is a driver used to generate a signal for transmission to a passive resonator circuit in accordance with an example.

In another embodiment, FIG. 2C illustrates a half-bridge driver 200*c* configured to generate the near field magnetic radiating signal for transmission from the transmitting antenna (e.g., 120*a*) to the passive resonator (e.g., 110*a* to 110*i*). The half-bridge driver 200*c* can comprise: a voltage source 230; first and second switching transistors 231*a* and 231*b* each having a control terminal (e.g., 232*a* and 234*a*); a loop antenna 242, and a capacitor 246. The loop antenna 242 can be coupled to the capacitor 246 at node 244 and tuned to resonate at a slightly less than the transmission frequency (e.g., 40.68 MHz) so that the switching transistors have low-loss switching. In one example, the current in the loop antenna 242 can be sinusoidal with a peak current of about 27A. A GaN FET can be used to operate with this amount of current and can also facilitate low losses (less than about 2-3 W each). The FET can be configured to switch in less than about 1 ns.

Figure 2D:
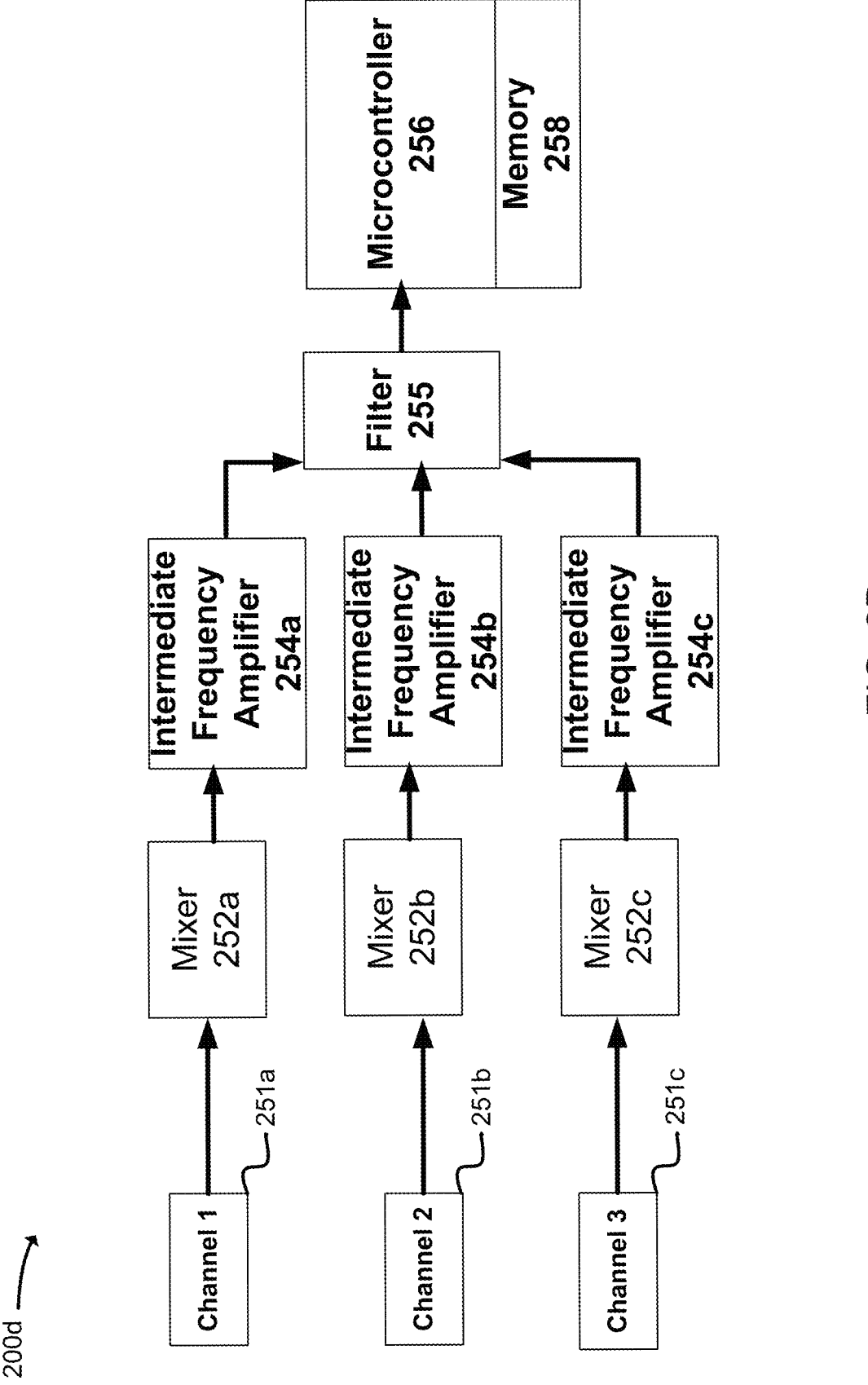
FIG. 2D is an illustration of a vector network analyzer (VNA) in accordance with an example.

In another embodiment, FIG. 2D illustrates a multi-channel signal processor 200*d*. The multi-channel signal processor 200*d* can be configured to receive signals on one or more channels (e.g., 251*a*, 251*b*, 251*c*). Corresponding mixers 252*a-c* can be configured to receive Radio Frequency (RF) signals from the one or more channels (e.g., 251*a*, 251*b*, 251*c*) and down-convert the RF signals to one or more low intermediate frequencies (IF) signals (e.g., 10.7 MHz or 10-12 MHz). The corresponding intermediate frequency amplifier 254*a-c* can be configured to receive and amplify the IF signals. The filter 255 can be a low-pass filter (LPF) or band-pass filter (BPF) configured to remove unwanted signals from the down-converted signals to generate output baseband signals. Output baseband signals can be provided to the microcontroller 256 for further processing.

The microcontroller 256 can be configured to receive the amplified IF signals and digitize the amplified IF signals using an analog to digital converter (ADC). The microcontroller 256 can be configured to handle various radio control functions. In other embodiments, some or all of the functionality of can be included in modules stored in the memory 258 and executed via the microcontroller 256. The radio control functions can include, but are not limited to, signal modulation/demodulation, encoding/decoding, radio frequency shifting, etc.

The microcontroller 256 can be configured to demodulate a modulated signal received from a passive resonator and identify data from the demodulated signal. In one example, the modulated signal can include data about the location of the passive resonator and the microcontroller 256 can identify the location of the passive resonator for further processing. In another example, and the microcontroller 256 can be configured to calculate a phase difference between pairs of received signals.

Figure 2E:
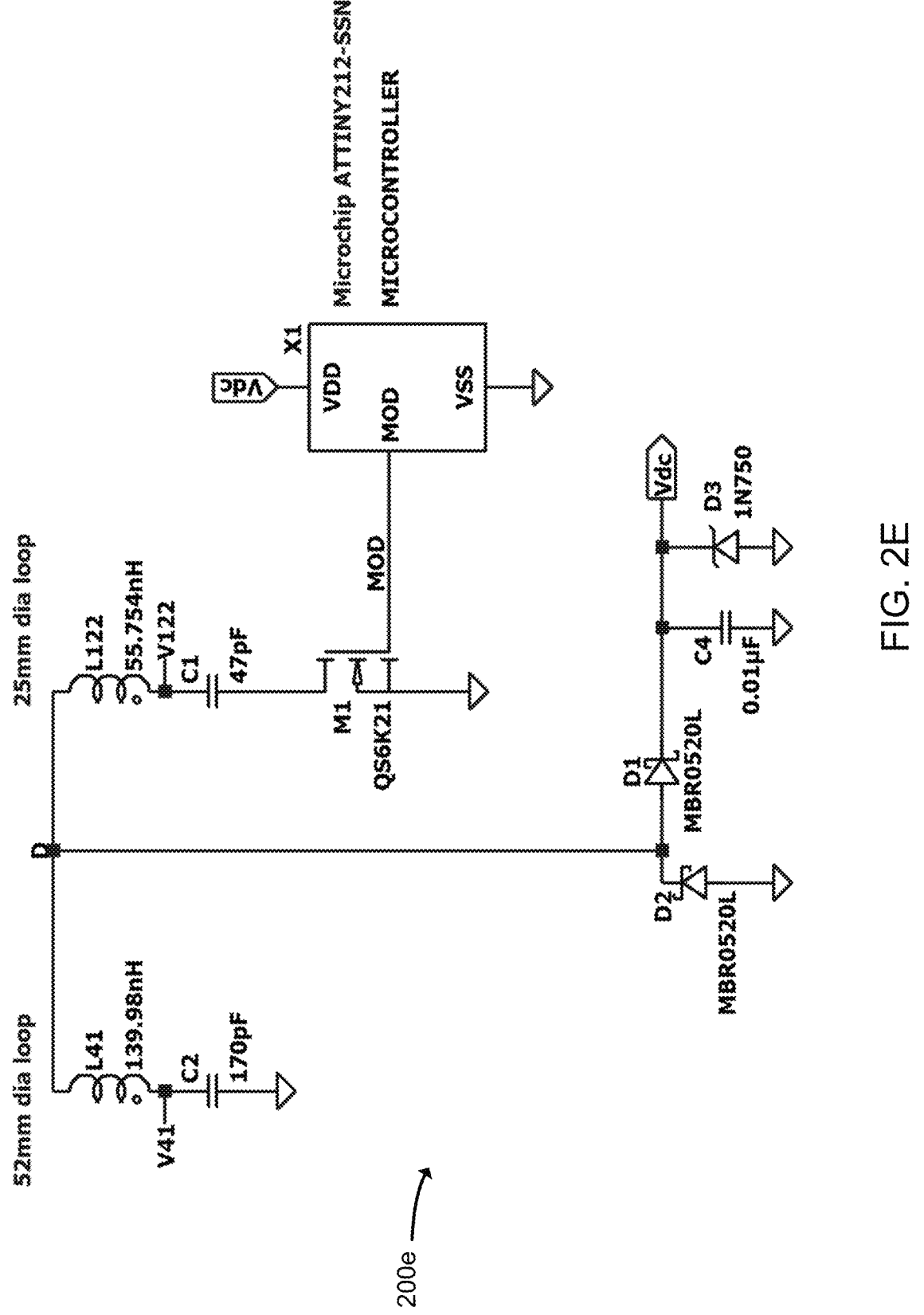
FIG. 2E is a schematic of a logic circuit which modulates a harmonic for transmission to a vehicle in accordance with one example.
Figure 2F:
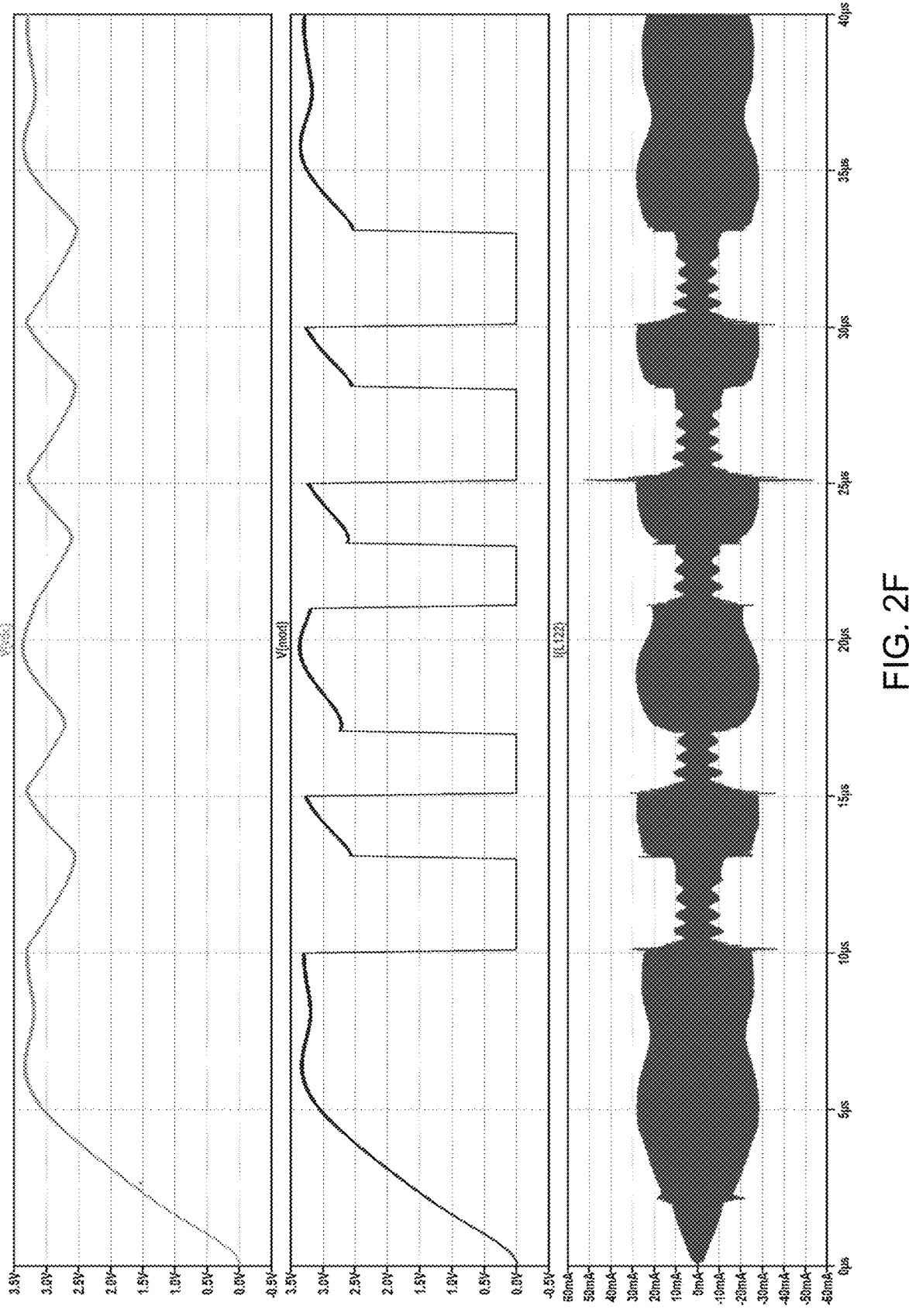
FIG. 2F is a set of waveforms corresponding to the performance of the logic circuit of FIG. 2E.

In still another example, shown in FIG. 2E a logic circuit 200*e* can modulate the harmonic for transmission to a vehicle. FIG. 2F shows a corresponding DC output voltage waveform, near-square control waveform, and resulting modulated resonant current.

Figure 3:
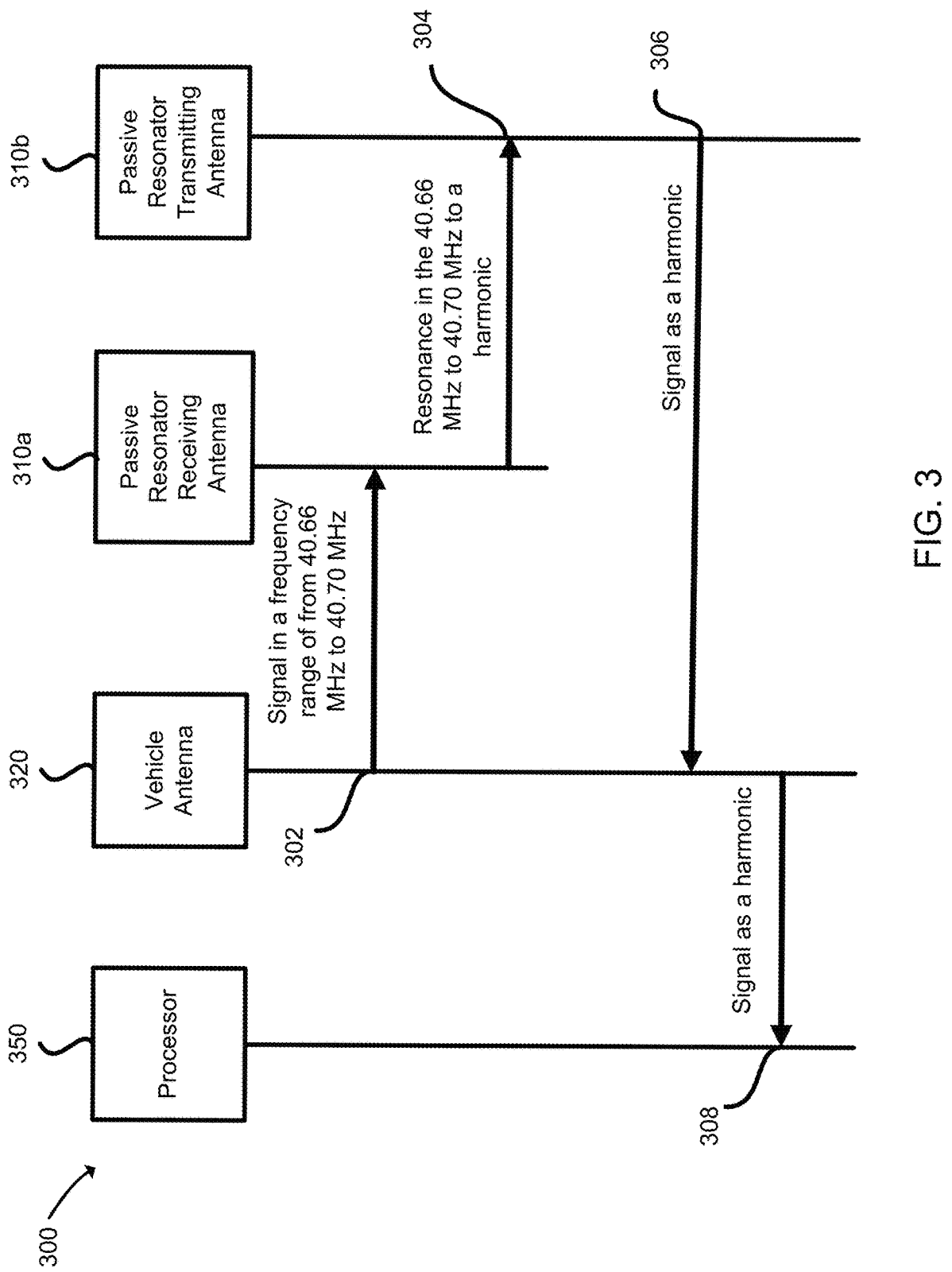
FIG. 3 is flow diagram for signaling among a processor, a vehicle antenna, a passive resonator receiving antenna, and a passive resonator transmitting antenna is accordance with an example.

In another embodiment, FIG. 3 depicts a signaling diagram 300 among a processor 350, a vehicle antenna 320, a passive resonator receiving antenna 310*a*, and a passive resonator transmitting antenna 310*b*. In one example, a vehicle antenna 320 can be configured to transmit a signal in a frequency range of from about 40.66 MHz to about 40.70 MHz to a passive resonator receiving antenna 310*a*, as shown in operation 302. In another example, a passive resonator receiving antenna 310*a* can be configured to receive the signal in a frequency range of from about 40.66 MHz to about 40.70 MHz and the passive resonator circuit can be configured to generate a harmonic of the signal, as shown in operation 304. The passive resonator transmitting antenna can be configured to transmit the signal as a harmonic to the vehicle antenna 320, as shown in operation 306. The vehicle antenna can be configured to transmit the harmonic signal to a processor 350, as shown in operation 308.

In one embodiment, the processor 350 can be configured to accurately estimate the CAV's 115 absolute location using its position relative to a particular circuit and previously encoded data of the absolute locations of each circuit. In some cases, this data may also include information about the locations of certain features relative to the circuits. The features could include exits, end of lane indicators, and lane lines.

Figure 4:
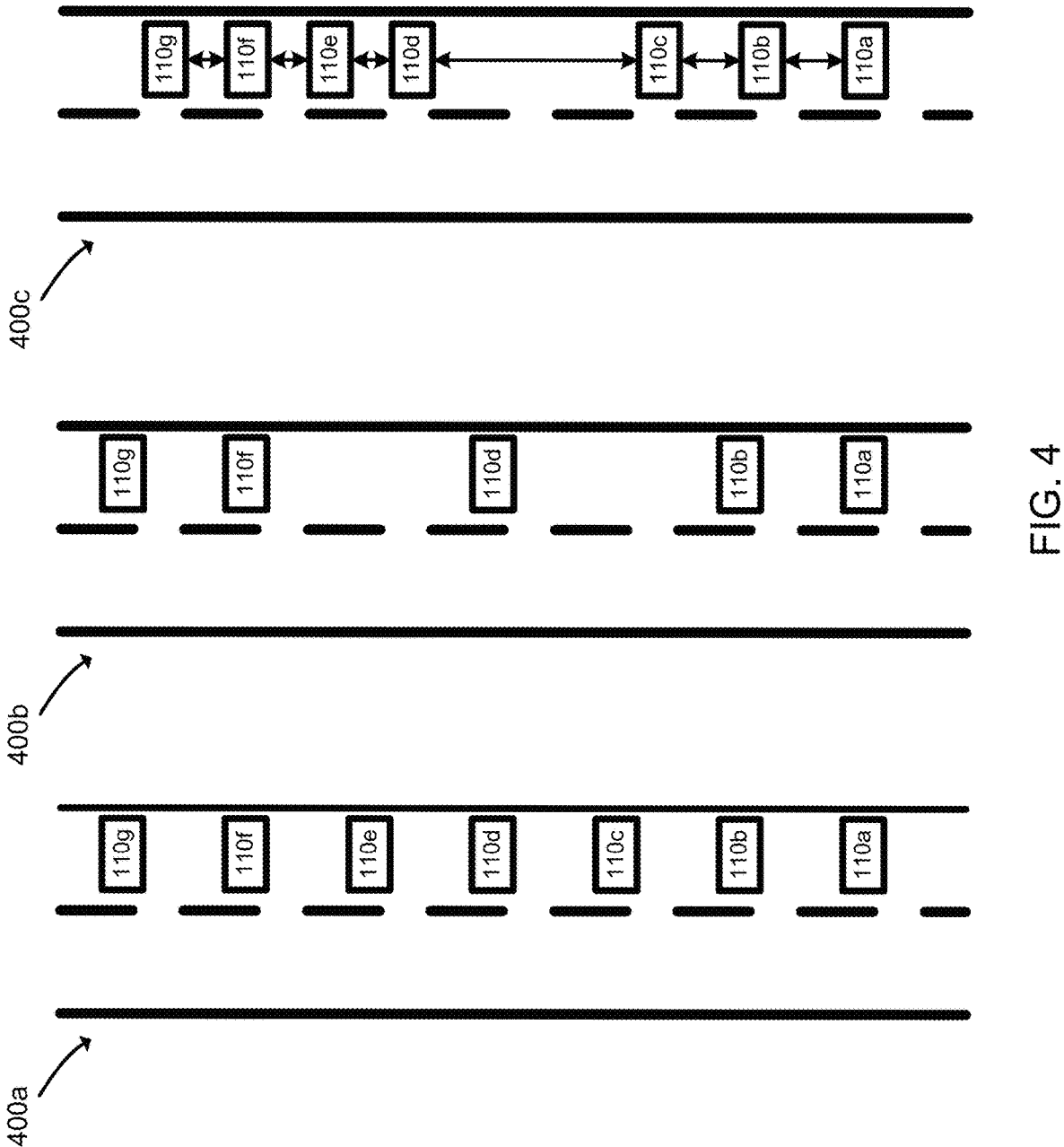
FIG. 4 is an illustration of on/off keying, frequency-shift keying, and pulse position modulation in accordance with an example.

In another embodiment, as illustrated in FIG. 4, a sequence of passive resonator circuits can provide data including an absolute vehicle position, an indication of upcoming exits or on-ramps, a lane number, an end of lane indicator, and the like. Data can be encoded by the presence or absence of a passive resonator circuit (e.g., on/off keying), transmission at different harmonics for each passive resonator circuit (e.g., frequency-shift keying), or spatial modulation relative to a centerline or relative to each passive resonator circuit in the along-track direction (e.g., pulse-position modulation). The passive resonator circuits can be further configured to provide error correction codes to provide robustness in case of malfunction of one or more passive resonator circuits.

In one example, the sequence of passive resonator circuits can provide an absolute location with a selected margin of error. In one example, closely-spaced passive resonator circuits near exits, on-ramps, or intersections can encode absolute position data with a margin of error of less than about 2 cm. In another example, for travel on open freeways, coarse absolute position can be provided via GNSS, while sparsely-placed IBCs can provide adequate data for robust lane following. In another example, when inside GNSS-degraded or denied environments (e.g., urban canyons) passive resonator circuit spacing and vehicle odometry data can be used to provide adequate data for robust lane following. In these scenarios, the data provided by the sequence of passive resonator circuits can reduce the on-board computational use by the CAV by reducing the use of costly perception computations and associated high-power hardware.

In one embodiment, as illustrated in FIG. 4, a sequence 400*a* of passive resonator circuits 110*a*, 110*b*, 110*c*, 110*d*, 110*e*, 110*f*, and 110*g* can be substantially uniformly spaced in the travel direction for a road. In this example, each of the passive resonator circuits can be configured to receive at a first frequency and re-transmit at a harmonic of the first frequency.

In another embodiment, the sequence 400*b* of passive resonator circuits 110*a*, 110*b*, 110*d*, 110*f*, and 110*g* can be modified from the sequence 400*a* to illustrate on-off keying data. In this example, the passive resonator circuits 110*c* and 110*e* can be absent or disabled to provide on-off keying (OOK) data for communication to a processor.

In another embodiment, the sequence 400c of passive resonator circuits 110a, 110b, 110c, 110d, 110e, 110f, and 110g can be modified from the sequence 400a to illustrate pulse position modulation (PPM) data. In this example, the passive resonator circuits 110c and 110d can be configured to be spaced differently than other passive resonator circuits (e.g., 110a and 110b). In this example, the passive resonator circuits can be configured to have a variation in spacing to provide PPM for communication to a processor.

In another embodiment, malfunctions in one or more passive resonator circuits can introduce errors in calculating the position of a CAV. The processor can be configured to generate encoded data using error correction codes to reduce the impact of malfunctions in one or more passive resonator circuits. In another embodiment, position estimates can be further enhanced by odometry data (e.g., estimates of relative displacement of the CAV from wheel encoders and steering angle sensors). Odometry data can be blended with data from the passive resonators in a state estimation algorithm, resulting in an estimate of the complete vehicle state (position, speed, and direction). Odometry data can include data based on the effective wheel diameter and biases in the steering angle sensors. The state estimation algorithm can be any suitable algorithm such as, but not limited to, at least one of a Kalman filter, an extended Kalman filter (EKF), unscented Kalman filter, and Particle filter. The EKF and other estimation algorithms can also support additional measurements when available, such as GNSS.

Figure 5:
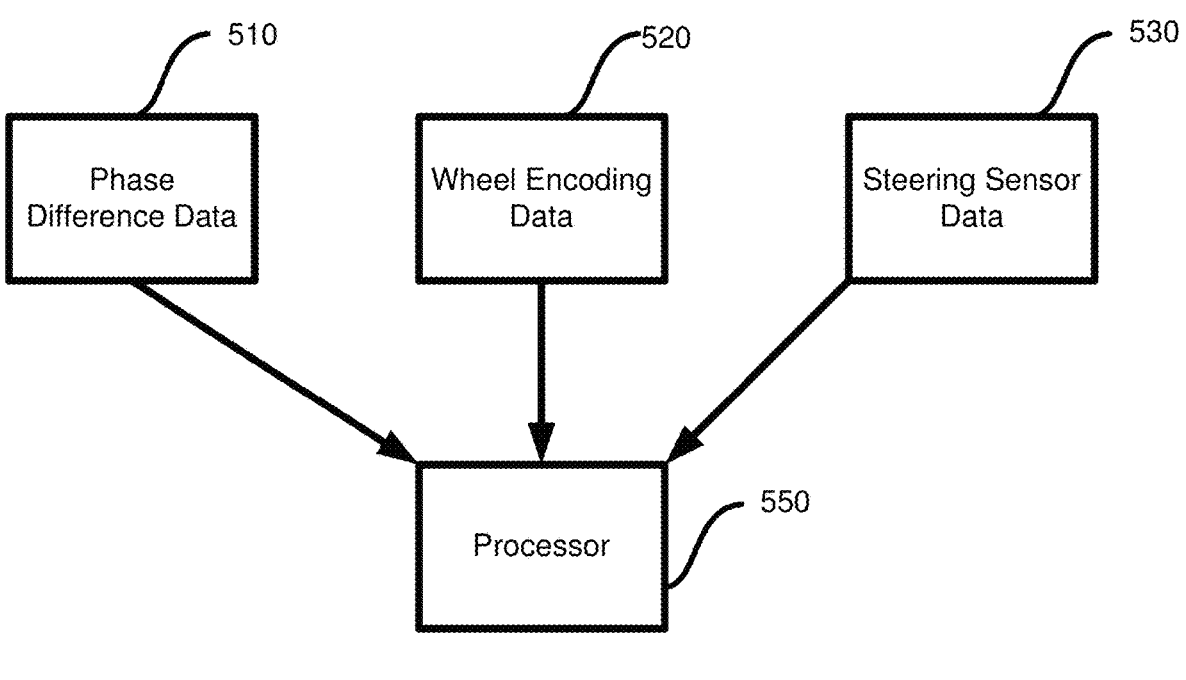
FIG. 5 is a flowchart depicting a phase difference, wheel encoding data, steering sensor data, and a processor in accordance with an example.

In one embodiment, as depicted in the flowchart in FIG. 5, the phase difference data 510 from one or more passive resonator circuits, the wheel encoding data 520 from one or more wheel encoders, and the steering sensor data 530 from one or more steering sensors can be provided to a processor 550 to calculate a complete state including the absolute position, a vehicle magnitude, and a vehicle heading.

In one example, the wheel encoder can be configured to measure wheel encoding data 520 comprising at least one of a wheel position, a wheel cycle count, a wheel speed, a wheel direction, and a combination thereof. In another example, a steering sensor can be configured to provide steering angle data 530 comprising at least one of a steering wheel position angle, a steering wheel rate of turn, and a combination thereof.

In one example, the processor 550 can be configured to receive odometry data (e.g., wheel encoding data, steering sensor data, or the like), from an odometry sensor (e.g., a wheel encoder, steering sensor, of the like) and calculate a relative location of the vehicle based on the odometry data. In one aspect, the relative position between the vehicle and the passive resonator can be calculated without using a global navigation satellite system (GNSS). More specifically, odometry sensors (e.g., wheel speed and steering angle, or an inertial measurement unit) provide accurate estimates of the change in vehicle state (i.e. position, velocity, heading), but can tend to accumulate errors over time. GPS or other source of absolute position can constrain the growth of these errors. For example, an estimation algorithm, like an extended Kalman filter, can statistically combine the data from the odometry sensors with the data from absolute sensors as a state update to eliminate accumulation errors. The growth of errors is typically slow, such that it can be feasible to decode the data contained in the sequence of the passive resonators using odometry measurements. Such data can include the position relative to exits, on-ramps, etc., or the absolute position of the vehicle, thus replacing GPS.

In another example, the processor 550 can be further configured to transmit a complete state of the vehicle to a controller of the vehicle. The controller can be configured to provide at least one of an acceleration signal, a deceleration signal, a braking signal, a braking release signal, a steering signal, and a combination thereof to a vehicle.

In still another aspect, the processor can be configured to encode the absolute position of the vehicle in the passive resonator sequence. Similarly, the processor can also encode road curvature, to aid in the control of autonomous vehicles.

Figure 6:
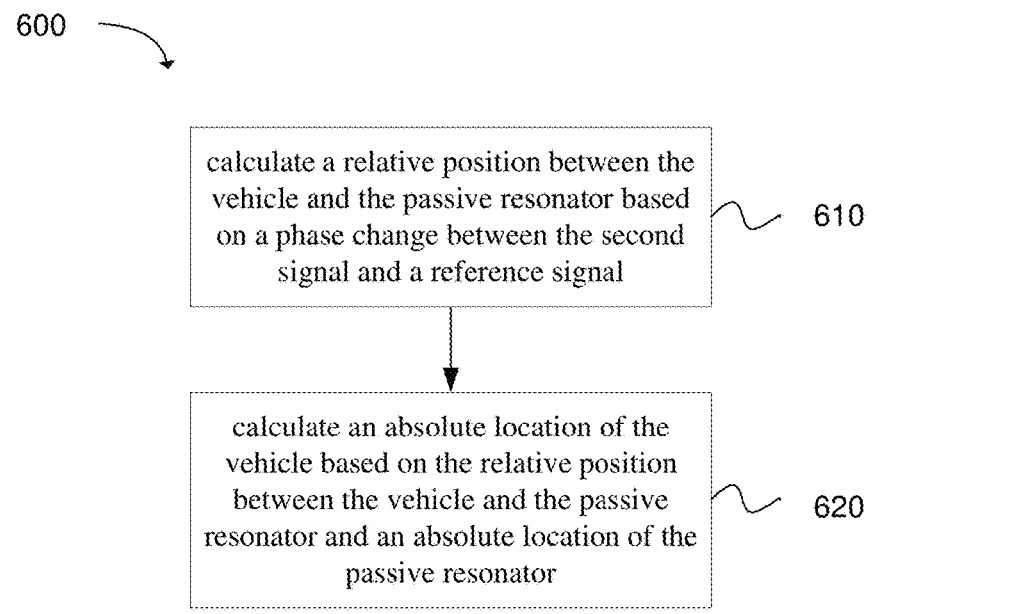
FIG. 6 is a flowchart depicting functionality for an intelligent breadcrumb (IBC) navigation system in accordance with an example.

FIG. 6 illustrates a flow diagram of a method according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

In one example, a method 600 for vehicle positioning is provided. The method can include calculating a relative position between the vehicle and the passive resonator based on a phase difference observed between the second signal and a reference signal, as shown in block 610. The method can further include calculating an absolute location of the vehicle based on the relative position between the vehicle and the passive resonator and an absolute location of the passive resonator, as shown in block 620.

Figure 7:
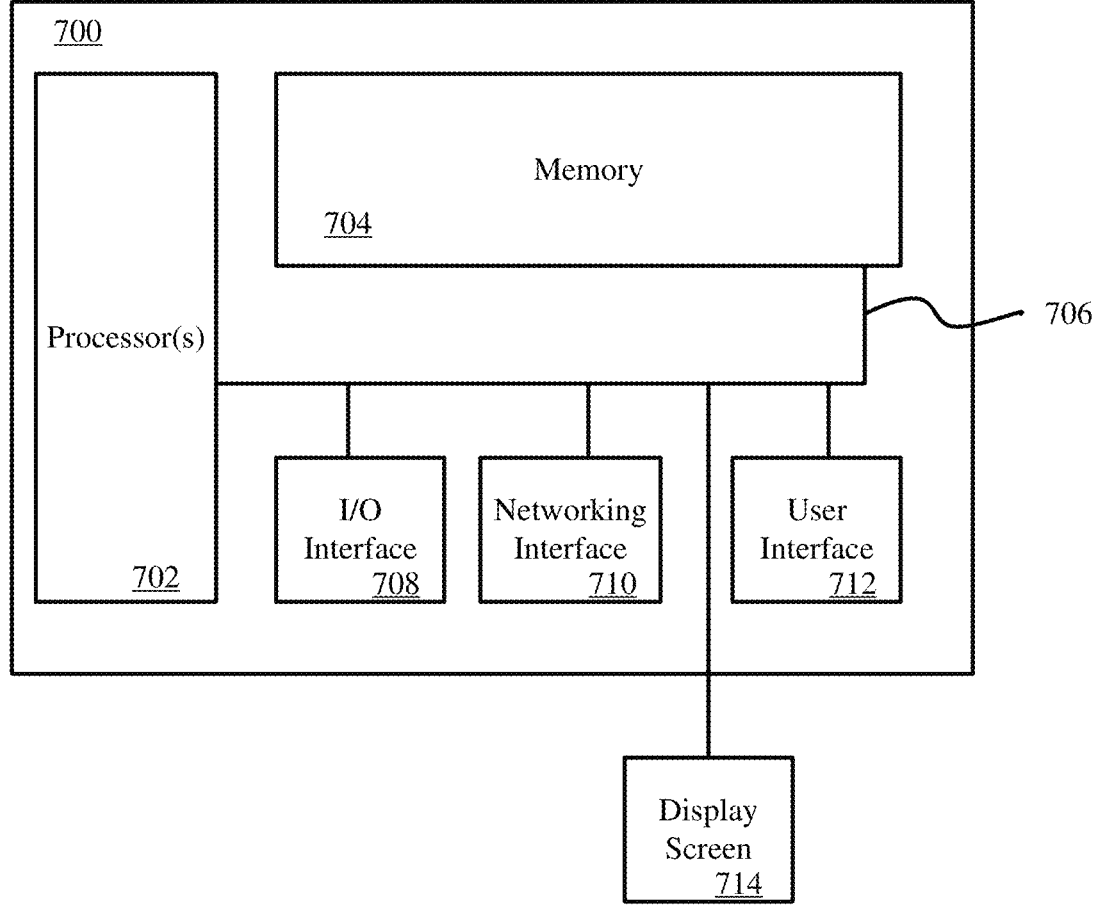
FIG. 7 is a computing system that includes a data storage device in accordance with an example.

FIG. 7 illustrates a general computing system or device 700 that can be employed in the present technology. The computing system 700 can include a processor 702 in communication with a memory 704. The memory 704 can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof.

The computing system or device 700 additionally includes a local communication interface 706 for connectivity between the various components of the system. For example, the local communication interface can be a local data bus and/or any related address or control busses as may be desired.

The computing system or device 700 can also include an I/O (input/output) interface 708 for controlling the I/O functions of the system, as well as for I/O connectivity to devices outside of the computing system 700. A networking interface 710 can also be included for network connectivity. The networking interface 710 can control network communications both within the system and outside of the system. The networking interface can include a wired interface, a wireless interface, a Bluetooth interface, optical interface, and the like, including appropriate combinations thereof. Furthermore, the computing system 700 can additionally include a user interface 712, a display device 714, as well as various other components that would be beneficial for such a system.

The processor 702 can be a single or multiple processors, and the memory 704 can be a single or multiple memories. The local communication interface 706 can be used as a pathway to facilitate communication between any of a single processor, multiple processors, a single memory, multiple memories, the various interfaces, and the like, in any useful combination.

EXAMPLES

The following examples are provided to promote a clearer understanding of certain embodiments of the present disclosure and are in no way meant as a limitation thereon.

Example 1: Passive Resonator Circuit

The circuit was as illustrated in FIG. 2A. The passive resonator circuit 200a had two concentric single-turn loop antennas 212 and 216 with the outer loop antenna 212 being about 52 mm in diameter and the inner loop antenna 216 being about 25 mm in diameter. The 52 mm outer loop antenna 212 had an inductance of about 140 nH, and it resonated with a 170 pF capacitor 213 at the 40.68 MHz ISM frequency. The 25 mm inner loop antenna 216 had an inductance of about 56 nH and resonated with a 47 pF capacitor 217 at about 122 MHz.

Example 2: Simulated Waveforms for FIG. 2a

Figures 8A, 8B, 8C:
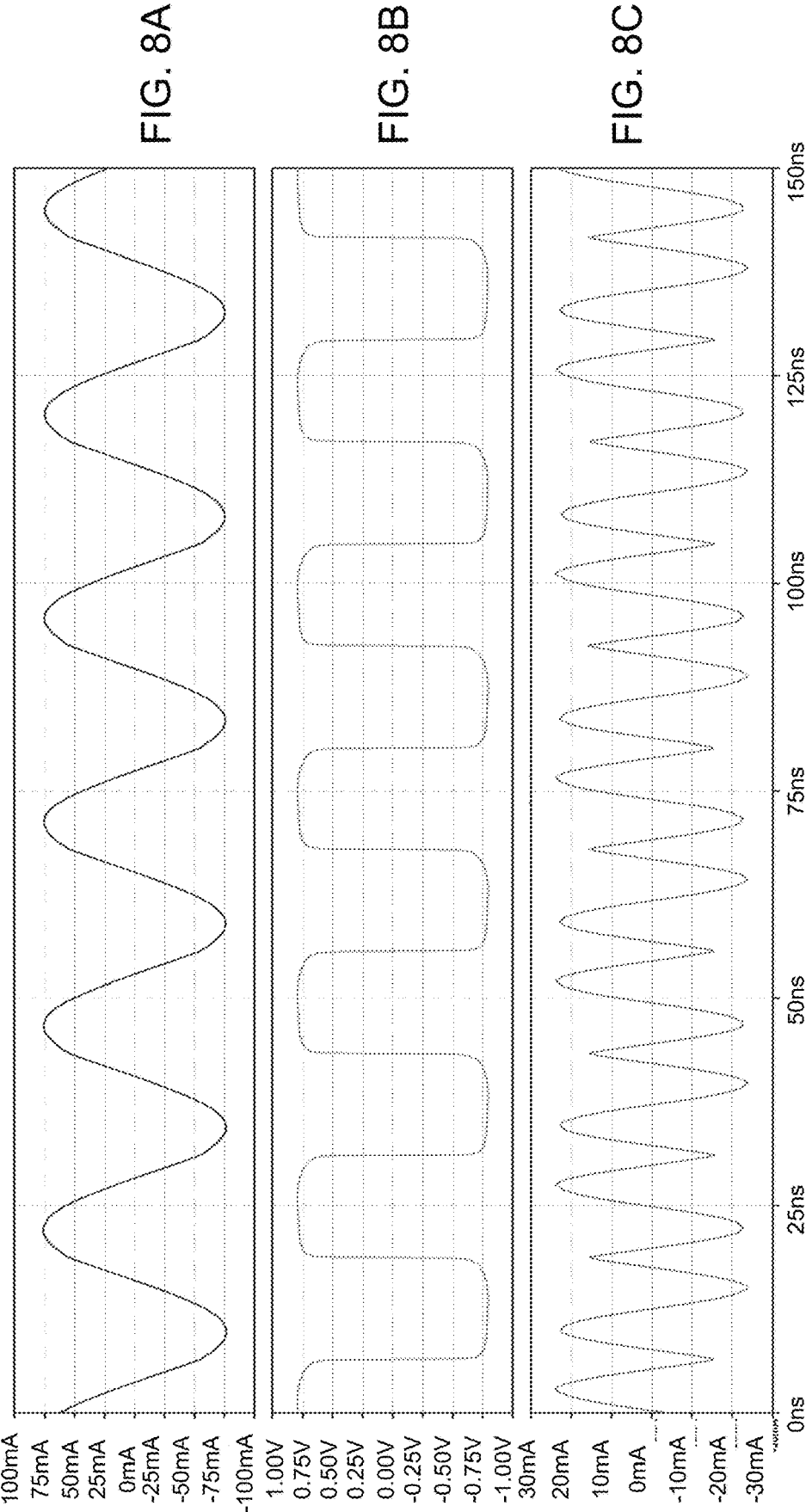
FIG. 8A is a waveform of the current flowing through a pair of inverse-parallel diodes of the passive resonator circuit in accordance with an example.
FIG. 8B is a waveform of the voltage across diodes at node 218 from input waveform of FIG. 8A.
FIG. 8C is a waveform of the current through the second loop antenna in accordance with an example.

A SPICE circuit simulation was performed to model the circuit of FIG. 2A. The transmitting antenna (e.g., 120a as illustrated in FIG. 1) generated near-field magnetic radiation at 40.68 MHz that the outer loop antenna 212 converted to a current as the outer loop antenna 212 and capacitor 213 resonated in series. This resonance developed an approximately square-wave voltage across the diodes 219a and 219b at node 218 as shown in FIG. 8B, due to the current from loop antenna 212 in FIG. 8A, and includes current from loop antenna 212 producing a current that creates voltage across the diodes which then stimulates a current in loop antenna 216 as illustrated in FIG. 8C. The diodes were type 1N4151 fast-switching low-capacitance silicon junction diodes. Schottky diodes can also be fast-switching but can generate a more rounded waveform with lower harmonic content.

Example 3: Current Waveform for the Inner Loop Antenna

The inner loop antenna 216 and the capacitor 217 were designed to resonate at the 3rd harmonic of the diode waveform (e.g., approximately 122 MHz). The third harmonic voltage at node 218 stimulated a 122 MHz current in the inner loop antenna 216 and the capacitor 217. The current in the inner loop antenna 216 caused a 122 MHZ signal to be radiated. The magnetic coupling between the outer loop antenna 212 and the inner loop antenna 216 changed the resonated frequencies from what the resonant frequencies would be if the outer loop antenna 212 and inner loop antenna 216 were uncoupled. The magnetic coupling coefficient between the outer loop antenna 212 and the inner loop antenna 216 was approximately 0.15—which was low enough to allow the outer loop antenna 212 and inner loop antenna 216 to be tuned to different frequencies. Other coil configurations can be used if the magnetic coupling between the outer loop antenna 212 and inner loop antenna 216 is low enough to accommodate the desired resonant frequencies.

The current waveform for the inner loop antenna 216 is shown in FIG. 8B. The fundamental current is at 122 MHz with some harmonic content. The vehicle and antenna array on the vehicle can largely diminish far-field transmission of the signal coming from the second loop antenna.

Example 4: Network Analyzer Results

An HP4194A network analyzer, with an upper frequency limit of 100 MHz, was used to test and simulate the signal from a passive resonator to a receiving antenna on a vehicle.

Signal from the Passive Resonator to a Receiving Antenna: The output from an oscillator was amplified with an HP462A amplifier to generate an open-circuit voltage of 4 Vpp with a gain of 20 dB. A 2 m cable was connected between the amplifier, which has a 50 ohm output impedance, and a 50 ohm termination resistor. A 1-inch diameter coil was connected in parallel with a small variable capacitor and a small fixed capacitor to produce about a 65 pF capacitance that resonated at about 100 MHz. The peak-to-peak voltage across the load and coil was about 2 Vpp. This resonant signal was used to simulate the resonant signal from a puck on a road surface to a receiving antenna on a vehicle.

Receiving Antenna on Vehicle: A 25 mm diameter receiving coil was connected to the input of a 30 dB wideband amplifier board that has 50 ohm input impedance and 50 ohm output impedance. The amplifier was powered by a 9V battery. The amplifier output was connected to the test input of the network analyzer. The reference signal was a 0.16 V signal generated by the network analyzer.

Physical Set-Up: The resonant signal transmitter was adhered to a wooden instrument. The receiving antenna was placed on a wooden structure. The distance between the resonant signal transmitter and the concrete floor was about one inch. Ferrite beads were placed along the length of the cable leading to the resonant signal transmitter to reduce interaction with the transmitting field.

Results: A phase shift of about 60 degrees was measured by moving the resonant signal transmitter from underneath the receiving antenna to about 24 inches away. Metal objects near the receiving antenna distorted the phase relationship but placing a copper sheet under the resonant signal transmitter had little effect. The network analyzer consistently resolved phase angles within about 1 degree for a given position. The amplitude received by the network analyzer was about 36 dB below the reference signal with the receiving antenna underneath the resonant signal transmitter and about 55 dB below the reference signal with the resonant signal transmitter about 24 inches away from the center position. These measurements were determined with 30 dB external receiving amplification. When the receiving antenna was placed directly on carpet, the phase could not be adequately measured. However, placing the receiving antenna 1 inch above concrete allowed the phase to be resolved.

Summary: Over 1000 cycles can be digitized while the puck is underneath the bumper. The puck position can be predicted to within about +/−5 cm.

Example 5: Oscilloscope Results—Third Harmonic Conversion

The third harmonic conversion process was tested by using a signal generator with a 50 ohm output to deliver 14 Vpp into a 52 mm diameter transmitting coil tuned to resonate at 33.3 MHz with a parallel-connected capacitor. A current signal of about 40 mApp was generated in a 52 mm diameter receiving coil that was connected across a pair of 1N4151 diodes. The diode forward recovery produced voltage spikes as the diodes turned on.

Figure 9:
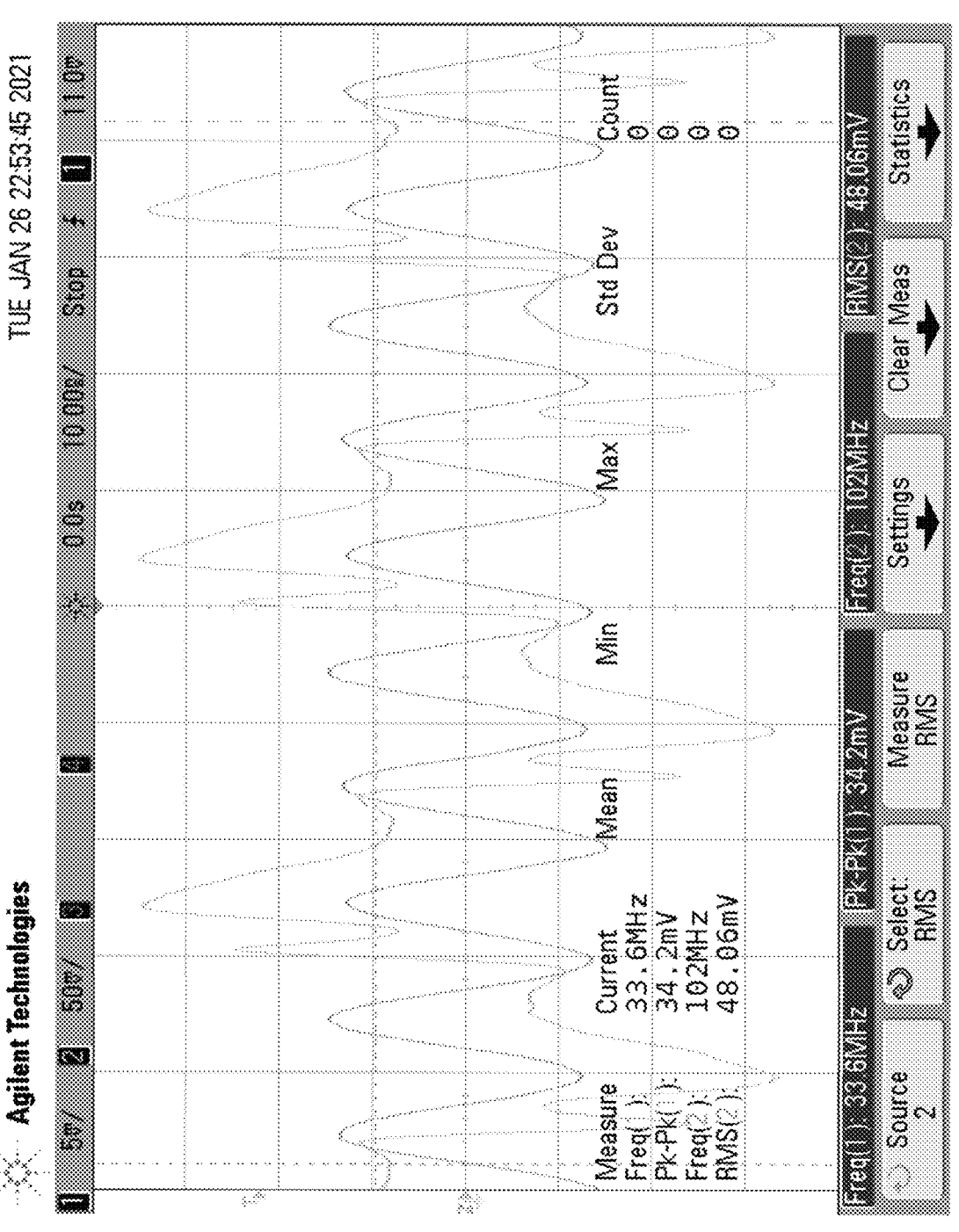
FIG. 9 is (i) a waveform of the voltage across the pair of inverse-parallel diodes of the passive resonator circuit in accordance with an example, and (ii) a waveform of the current through the second loop antenna in accordance with an example.

As illustrated in FIG. 9, the outer loop antenna 212 received 33.3 MHz (measured as 33.6 MHz) and transmitted 100 MHz (measured as 102 MHz) with the inner loop antenna 216. Waveform 1 is across the diode pair with a ×100 probe, 500 mV/div. Waveform 2 is the current in the inner loop at 50 mA/div.

Various techniques, or certain aspects or portions thereof, can take the form of program code (i.e., instructions) embodied in tangible media, such as non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as baseband processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting, or for similar reasons.

Reference was made to the examples illustrated in the drawings and specific language was used herein to describe the same. It will nevertheless be understood that no limitation of the scope of the technology is thereby intended. Alterations and further modifications of the features illustrated herein, and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A system for vehicle positioning, comprising:
a passive resonator configured to be embedded in a roadway, wherein the passive resonator comprises:
a first loop antenna connected in series with a first capacitor to form a first resonant circuit; a second loop antenna connected in series with a second capacitor to form a second resonant circuit;
a pair of diodes coupled in parallel with the first resonant circuit and the second resonant circuit;
at least one antenna configured to be attached to a vehicle and configured to transmit a first signal to the passive resonator, the at least one antenna configured to receive a second signal from the passive resonator, the first loop antenna configured to receive the first signal at a first frequency in a frequency band and the second loop antenna configured to transmit the second signal at a harmonic of the first frequency, and the passive resonator configured to:
receive the first signal from the at least one antenna, and
transmit the second signal to the at least one antenna, wherein the passive resonator does not have a power source other than the first signal; and
a processor configured to:
calculate a relative position between the vehicle and the passive resonator based on a phase difference observed between the second signal and a reference signal, and
calculate an absolute location of the vehicle based on the relative position between the vehicle and the passive resonator and an absolute location of the passive resonator.

2. The system of claim 1, wherein the at least one antenna is further configured to:
generate a radio-frequency magnetic field spanning at least:
a width of the vehicle, and
at least a distance from the at least one antenna to a road surface underneath the vehicle.

3. The system of claim 1, further comprising a wheel encoder configured to measure wheel encoding data comprising at least one of a wheel position, a wheel cycle count, a wheel speed, a wheel direction, and a combination thereof.

4. The system of claim 1, further comprising a steering sensor configured to detect steering angle data comprising at least one of a steering wheel position angle, a steering wheel rate of turn, and a combination thereof.

5. The system of claim 1, wherein the processor is further configured to receive odometry data from an odometry sensor and calculate a relative location of the vehicle based on the odometry data.

6. The system of claim 1, wherein the relative position between the vehicle and the passive resonator is calculated without using a global navigation satellite system (GNSS).

7. The system of claim 1, wherein a transmitting coil is configured to align a receiving coil of the vehicle to generate a selected level of in-motion wireless power transfer between the receiving coil and a transmitting coil in the roadway.

8. The system of claim 1, wherein the processor is further configured to transmit a complete state of the vehicle to a controller of the vehicle, wherein the controller is configured to generate at least one of an acceleration signal, a deceleration signal, a braking signal, a braking release signal, a steering signal, and a combination thereof.

9. The system of claim 1, wherein the harmonic is a third harmonic of the first signal.

10. The system of claim 1, wherein the first signal is a near-field magnetic radiation signal.

11. The system of claim 1, wherein the pair of diodes each comprise an inverse-parallel diode that is a small-signal junction diode.

12. The system of claim 1, wherein the pair of diodes are coupled to a logic circuit configured to modulate the harmonic of the first frequency.

13. The system of claim 1, wherein the harmonic is a third harmonic of the first frequency.

14. The system of claim 1, further comprising a transmitting coil that is configured to align a receiving coil on a vehicle to generate a selected level of in-motion wireless power transfer from the transmitting coil.

15. The system of claim 1, wherein the second loop antenna is configured to retransmit the harmonic to a height of from about 20 cm to about 80 cm.

16. The system of claim 1, wherein the processor is further configured to generate on-off keying (OOK) data based on presence or absence of a signal from the passive resonator.

17. The system of claim 1, wherein the processor is further configured to generate pulse position modulation (PPM) data based on spatial modulation of the passive resonator.

18. The system of claim 1, wherein the processor is further configured to generate encoded data using error correction codes.

19. The system of claim 1, wherein the processor is further configured to calculate a complete state of the vehicle based on odometry data in a state estimation algorithm, wherein the complete state includes the absolute position, a vehicle velocity magnitude, and a vehicle heading.

20. The system of claim 19, wherein the state estimation algorithm is at least one of a Kalman filter, an extended Kalman filter, unscented Kalman filter, and Particle filter.

21. The system of claim 1, wherein the processor is further configured to calculate the relative position between the vehicle and at least one of an exit ramp, an on-ramp, a lane number, an end of lane indicator, and a combination thereof based on passive resonator sequence data comprising on-off keying (OOK) data, frequency-shift keying (FSK) data, or pulse position modulation (PPM) data.

* * * * *